(12) United States Patent
Nakamura et al.

(10) Patent No.: US 8,573,809 B2
(45) Date of Patent: Nov. 5, 2013

(54) ILLUMINATION DEVICE

(75) Inventors: Kyohei Nakamura, Kyoto (JP);
Toshizumi Okada, Osaka (JP);
Hiroyuki Sekii, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/560,081

(22) Filed: Jul. 27, 2012

(65) Prior Publication Data

US 2013/0051010 A1 Feb. 28, 2013

(30) Foreign Application Priority Data

Aug. 24, 2011 (JP) .................................. 2011-182151
Aug. 24, 2011 (JP) .................................. 2011-182152

(51) Int. Cl.
*F21S 8/00* (2006.01)

(52) U.S. Cl.
USPC .. 362/268; 362/235; 362/249.02; 362/311.02

(58) Field of Classification Search
USPC .................. 362/268, 235, 249.02, 311.02
See application file for complete search history.

(56) References Cited

U.S. PATENT DOCUMENTS

2011/0085329 A1* 4/2011 Kuo .............................. 362/235
2011/0194279 A1* 8/2011 Kuo .............................. 362/235

FOREIGN PATENT DOCUMENTS

JP        2003-086006      3/2003
JP        2006-196320      7/2006

* cited by examiner

*Primary Examiner* — Mary Ellen Bowman
(74) *Attorney, Agent, or Firm* — Greenblum & Bernstein, P.L.C.

(57) ABSTRACT

An illumination device includes a plurality of light sources for emitting light and an optical member arranged in front of the light sources to control distribution of the light emitted from the light sources. The optical member includes a plurality of lens portions having storage recess portions formed in alignment with the light sources to accommodate the light sources and a plurality of ribs extending laterally from the lens portions to fix the lens portions to a substrate holding the light sources, each of the lens portions having a light distribution control portion formed in a rear opening edge of each of the storage recess portions to distribute frontward the light emitted from the light sources toward the ribs.

11 Claims, 10 Drawing Sheets

ILLUMINATION DEVICE

FIELD OF THE INVENTION

The present invention relates to an illumination device.

BACKGROUND OF THE INVENTION

In the past, there is available a light source device using a lens (e.g., Japanese Patent Application Publication No. 2006-196320 (JP2006-196320A), Paragraphs [0016] to and FIG. 1). The light source device includes a light source unit for emitting light and a convex lens arranged in front of the light source unit to control the distribution of the light emitted from the light source unit. With respect to the optical axis of the convex lens, the outer circumference of the convex lens is formed outside the position where the incidence angle of the light emitted from the light source unit with respect to the interface to the ambient air forms a critical angle. This configuration reduces the ratio of the light totally reflected in the interface. It is therefore possible to enhance the light projection efficiency of the light source device.

Conventionally, there is also available an illumination device attachable to a ceiling (see, e.g., Japanese Patent Application Publication No. 2003-86006 (JP2003-86006A), Paragraphs [0022] to [0031] and FIGS. 1 to 4). This illumination device includes a disc-shaped base plate. A power-feeding unit and a lighting device are attached to the generally central area of the base plate. On one surface of the base plate, a plurality of LEDs is annularly arranged around the lighting device. In front of the LEDs, a light distribution control member is provided in a rotatable manner. In the light distribution control member, narrow-angle light distribution portions for collecting the light emitted from the LEDs at a position just below the LEDs and wide-angle light distribution portions for diffusing the light emitted from the LEDs are alternately arranged along the arrangement direction of the LEDs.

In the illumination device, if the light distribution control member is rotated to bring the narrow-angle light distribution portions into alignment with the LEDs, it is possible to collect the light emitted from the LEDs at a position just below the LEDs. If the wide-angle light distribution portions are brought into alignment with the LEDs, it is possible to diffuse the light emitted from the LEDs at a wide angle.

With the light source device disclosed in JP2006-196320A, it is possible to enhance the light projection efficiency. However, the size of the convex lens grows larger. This poses a problem in that the overall size of the light source device becomes larger.

With the illumination device disclosed in JP2003-86006A, the light emitted from the LEDs can be distributed at a wide angle. However, the light quantity in the device center where the lighting device is arranged becomes smaller than the light quantity in the position just below the LEDs. As a consequence, the central area grows darker than the remaining area. This poses a problem in that the aesthetic appearance becomes bad.

SUMMARY OF THE INVENTION

In view of the above, the present invention provides an illumination device capable of enjoying enhanced light projection efficiency and reduced size.

Furthermore, the present invention provides an illumination device capable of distributing the light emitted from LEDs over the whole surface of a diffusing member and consequently improving the aesthetic appearance of the device.

In accordance with one aspect of the present invention, there is provided an illumination device, including: a plurality of light sources for emitting light; and an optical member arranged in front of the light sources to control distribution of the light emitted from the light sources, wherein the optical member includes a plurality of lens portions having storage recess portions formed in alignment with the light sources to accommodate the light sources and a plurality of ribs extending laterally from the lens portions to fix the lens portions to a substrate holding the light sources, each of the lens portions having a light distribution control portion formed in a rear opening edge of each of the storage recess portions to distribute frontward the light emitted from the light sources toward the ribs.

Preferably, the light sources may be arranged in at least two rows with a specified gap left between the rows, the optical member including a connecting portion for interconnecting the lens portions provided in alignment with the light sources of the respective rows, the light distribution control portion being configured to distribute frontward the light emitted from the light sources toward the connecting portion.

Preferably, the light distribution control portion may have a bevel portion formed in the rear opening edge of each of the storage recess portions by a chamfering work.

Preferably, the light distribution control portion may have a convex portion formed in the rear opening edge of each of the storage recess portions.

Preferably, the light sources and the lens portions may be arranged in an annular pattern.

In accordance with another aspect of the present invention, there is provided an illumination device, including: a device body; a power-feeding unit arranged in a central region of the device body; a plurality of LEDs annularly arranged around the power-feeding unit, the LEDs being turned on by electric power supplied from the power-feeding unit; an optical member arranged in front of the LEDs to control distribution of the light emitted from the LEDs; and a diffusing member arranged in front of the optical member to diffuse the light whose distribution is controlled by the optical member, wherein the optical member includes forwardly-bulging lens portions provided in alignment with the LEDs, each of the lens portions having a first convex portion arranged in an end portion thereof near the power-feeding unit in a first direction interconnecting each of the lens portions and the power-feeding unit and configured to distribute the light emitted from the corresponding LEDs toward a central region of the diffusing member; and a second convex portion arranged in the opposite end portion from the power-feeding unit in the first direction and configured to distribute the light emitted from the corresponding LEDs toward an outer edge region of the diffusing member.

Preferably, a projection angle of a most-intensive first major beam projected from the first convex portion and a projection angle of a most-intensive second major beam projected from the second convex portion may be set equal in the respective lens portions.

Preferably, a projection angle of a most-intensive first major beam projected from the first convex portion with respect to an optical axis of each of the LEDs and a projection angle of a most-intensive second major beam projected from the second convex portion with respect to the optical axis of each of the LEDs may be set equal in the respective lens portions.

Preferably, each of the lens portions may have an incidence surface and a projection surface, at least one of which is subjected to a diffusing treatment.

Preferably, each of the lens portions may be configured such that the diffusivity in a region near an optical axis of the corresponding LED becomes higher than the diffusivity in other regions.

With the present invention, there is provided an illumination device capable of enjoying enhanced light projection efficiency and reduced size.

With the present invention, there is provided an illumination device capable of distributing the light emitted from LEDs over the whole surface of a diffusing member and consequently improving the aesthetic appearance of the device.

BRIEF DESCRIPTION OF THE DRAWINGS

The objects and features of the present invention will become apparent from the following description of embodiments, given in conjunction with the accompanying drawings, in which.

DETAILED DESCRIPTION OF THE PREFERRED EMBODIMENTS

One embodiment of an illumination device will now be described with reference to the accompanying drawings which form a part hereof. The illumination device of the present embodiment is, e.g., a ceiling light. The illumination device is directly attached to the ceiling and is used to illuminate the whole indoor area. In the following description, a ceiling light will be described as one example of the illumination device. However, the present illumination device is not limited to the ceiling light but may be other kinds of illumination devices.

Figure 2:
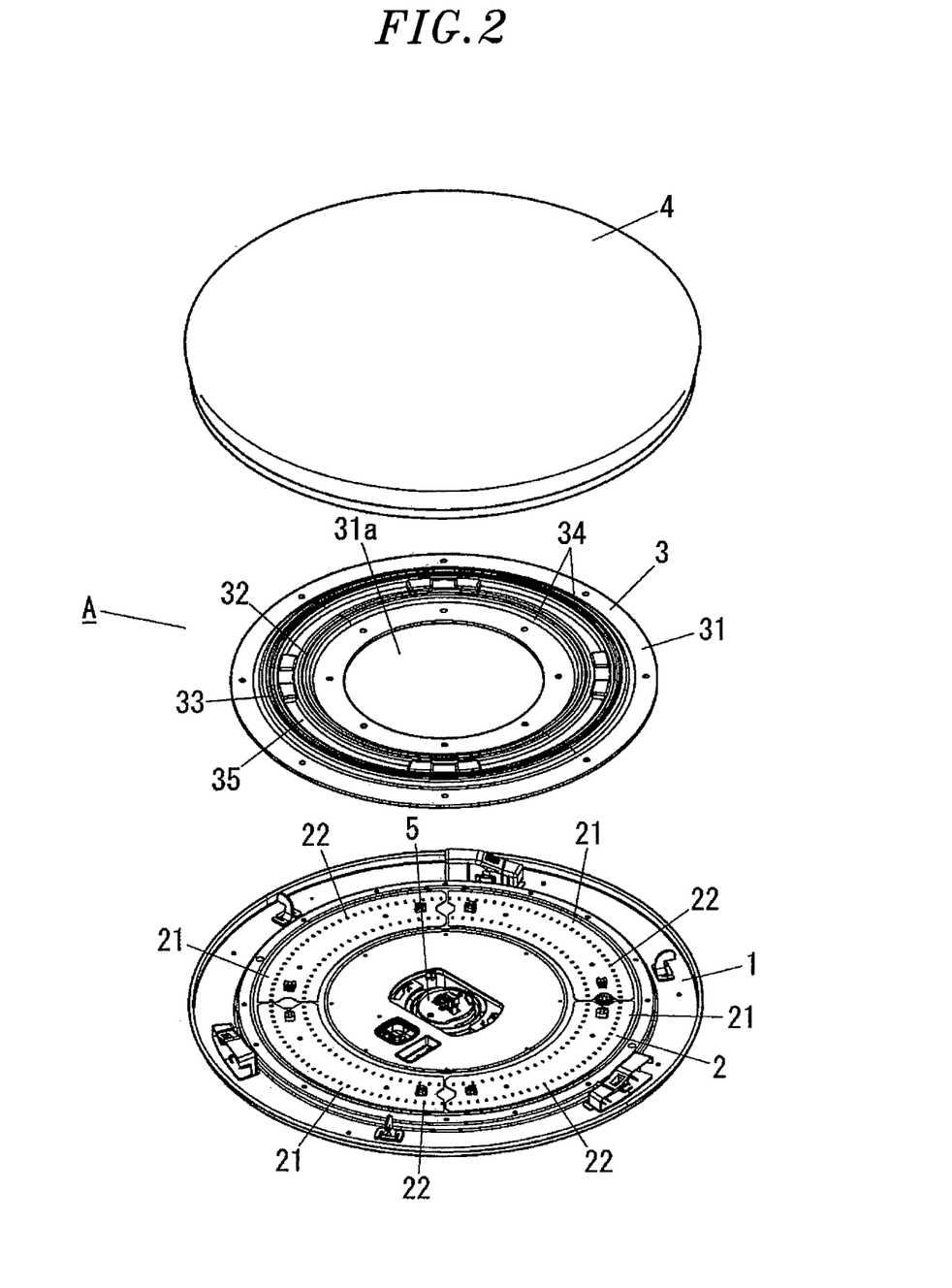
FIG. 2 is an exploded perspective view of the illumination device.

FIG. 2 is an exploded perspective view showing one example of an illumination device A of the present embodiment. The illumination device A includes a device body 1 formed into a disc-like shape, a power-feeding unit 5 arranged in the central region of the device body 1 and a light emitting unit 2 annularly arranged around the power-feeding unit 5. The illumination device A further includes an optical member 3 arranged in front of the light emitting unit 2 to control the distribution of the light emitted from the light emitting unit 2 and a diffusing member 4 arranged in front of the optical member 3 to diffuse the light whose distribution is controlled by the optical member 3.

The light emitting unit 2 includes a plurality of (four, in FIG. 2) mounting substrates 21 curved in an arc shape. On one surface (the upper surface, in FIG. 2) of each of the mounting substrates 21, a plurality of LEDs (Light Emitting Diodes) 22 is mounted in two rows in the width direction of the mounting substrates 21 and arranged along the circumferential direction of the mounting substrates 21. As shown in FIG. 2, the mounting substrates 21 are annularly arranged around the power-feeding unit 5 positioned in the central region of the device body 1. The mounting substrates 21 are attached to the device body 1 by, e.g., attachment screws (not shown). In the present embodiment, the LEDs 22 make up a light source.

The power-feeding unit 5 generates lighting electric power for lighting the LEDs 22 mounted to the mounting substrates 21 and supplies the lighting electric power to the respective mounting substrates 21 through electric wires (not shown). More specifically, the power-feeding unit 5 converts the AC current supplied from an external power source (not shown) to a DC current having a desired voltage value (a voltage value required in lighting the LEDs 22) and supplies the converted DC current to the respective mounting substrates 21. The power-feeding unit 5 is attached to the device body 1 by, e.g., attachment screws (not shown).

The diffusing member 4 is made of, e.g., a milky white acryl resin added with a light diffusing agent and is formed into a dome shape with one surface thereof (the lower surface, in FIG. 2) opened. The diffusing member 4 is detachably attached to the device body 1 at the front side of the optical member 3.

Figure 1:
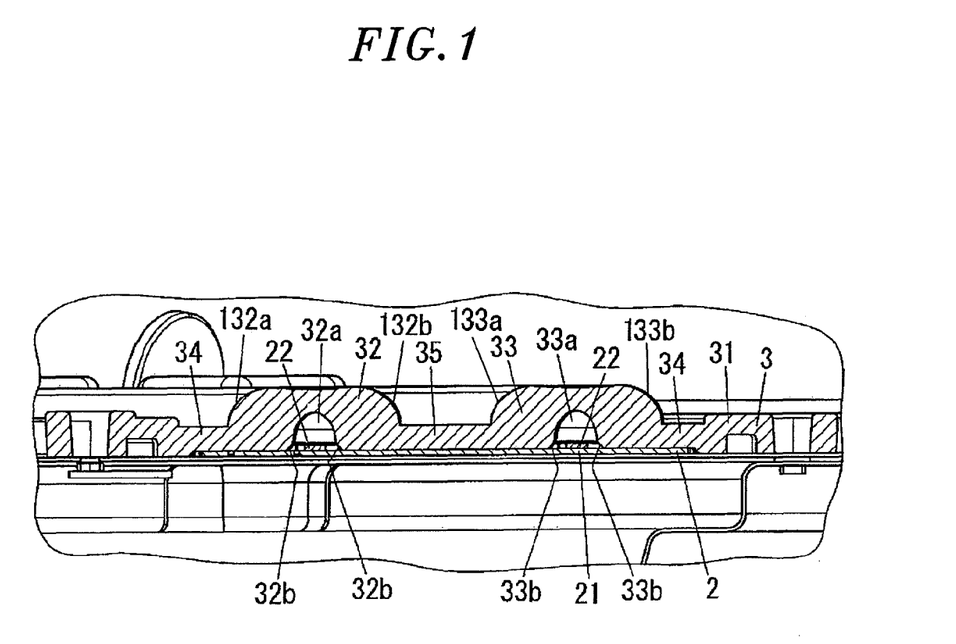
FIG. 1 is a partially enlarged section view showing an illumination device according to one embodiment of the present invention.

The optical member 3 is made of a light-transmitting material (e.g., an acryl resin, a polycarbonate resin or glass). The optical member 3 includes a disc-shaped body portion 31 having a circular opening 31a formed in the central region thereof. On one surface (the upper surface, in FIG. 2) of the body portion 31, there are concentrically provided two rows of lens portions 32 and 33 bulging frontward (toward the upper side, in FIG. 2) as shown in FIGS. 1 and 2. In the present embodiment, the lens portion 32 is provided in alignment with the LEDs 22 mounted to the inner region (near the power-feeding unit 5) of each of the mounting substrates 21. The lens portion 33 is provided in alignment with the LEDs 22 mounted to the outer region (distant from the power-feeding unit 5) of each of the mounting substrates 21.

A connecting portion 35 interconnecting the lens portions 32 and 33 is one-piece formed between the lens portions 32 and 33 in the radial direction of the device body 1 (in the left-right direction in FIG. 1). Ribs 34 serving to fix the lens portions 32 and 33 to the mounting substrates 21 are one-piece formed at the opposite sides of the lens portions 32 and 33 from the connecting portion 35 in the radial direction. Circular storage recess portions 32a and 33a for accommodating the corresponding LEDs 22 are provided on the rear surfaces (the lower surface in FIG. 1) of the respective lens portions 32 and 33. Bevel portions 32b and 33b formed by a chamfering work are formed at the opening edges of the storage recess portions 32a and 33a of the respective lens portions 32 and 33. It is preferred that the upper edges of the bevel portions 32b and 33b be positioned higher than the upper end surfaces (i.e., the light emitting surfaces) of the LEDs 22. The lens portions 32 and 33 will now be described in detail.

The lens portion 32 is formed to have a curved bulging surface bulging frontward (toward the upper side in FIG. 1). The lens portion 32 has a storage recess portion 32a formed on the rear surface (the lower surface in FIG. 1) thereof to accommodate the corresponding LEDs 22. A first convex portion 132a is formed in the end section of the lens portion 32 near the power-feeding unit 5 (in the left end section of the lens portion 32 in FIG. 1) in the connecting direction of the lens portion 32 and the power-feeding unit 5 assembled together (namely, in the first direction or the left-right direction in FIG. 1). The light emitted from the LEDs 22 and projected on the first convex portion 132a is distributed toward the central region of the diffusing member 4 arranged in front of the lens portion 32. A second convex portion 132b is formed in the opposite end section of the lens portion 32 from the power-feeding unit 5 (in the right end section of the lens portion 32 in FIG. 1) in the first direction. The light emitted from the LEDs 22 and projected on the second convex portion 132b is distributed toward the outer edge region of the diffusing member 4 arranged in front of the lens portion 32.

Similarly, the lens portion 33 is formed to have a convex curved surface bulging frontward (toward the upper side in FIG. 1). The lens portion 33 has a storage recess portion 33a formed on the rear surface (the lower surface in FIG. 1) thereof to accommodate the corresponding LEDs 22. A first convex portion 133a is formed in the end section of the lens portion 33 near the power-feeding unit 5 (in the left end section of the lens portion 33 in FIG. 1) in the first direction. The light emitted from the LEDs 22 and projected on the first convex portion 133a is distributed toward the central region of the diffusing member 4 arranged in front of the lens portion 33. A second convex portion 133b is formed in the opposite end section of the lens portion 33 from the power-feeding unit 5 (in the right end section of the lens portion 33 in FIG. 1) in the first direction. The light emitted from the LEDs 22 and projected on the second convex portion 133b is distributed toward the outer edge region of the diffusing member 4 arranged in front of the lens portion 33. The optical member 3 is attached to the device body 1 by, e.g., attachment screws (not shown). Description will be made later on the light distribution characteristics of the lens portions 32 and 33.

Figure 3A:
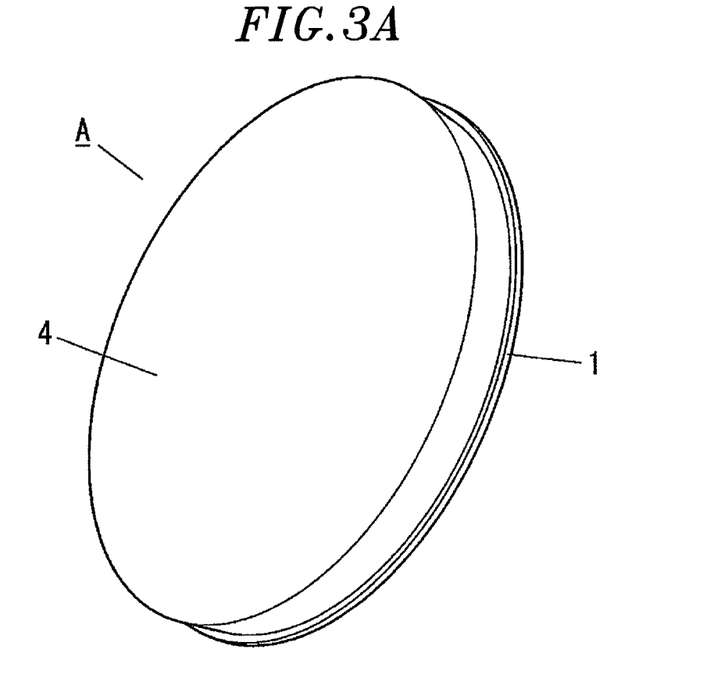
FIG. 3A is a front perspective view of the illumination device and FIG. 3B is a rear perspective view of the illumination device.
Figure 3B:
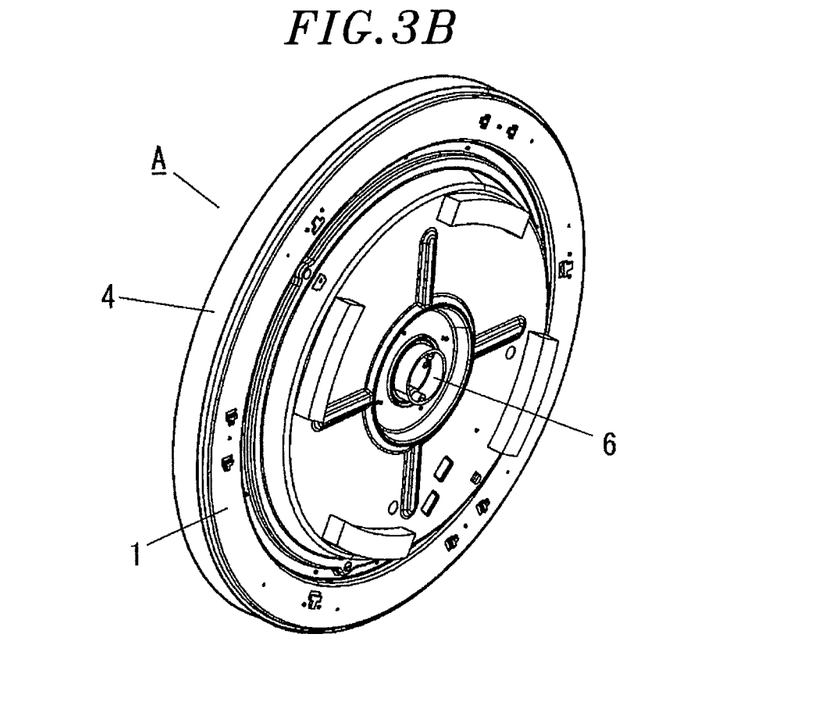

Next, description will be made on the assembling order of the illumination device A. The power-feeding unit 5 is attached to the central region of the device body 1 and the mounting substrates 21 are attached to one surface (the upper surface in FIG. 2) of the device body 1. Then, the power-feeding unit 5 and the mounting substrates 21 are electrically connected to each other by use of electric wires (not shown). Thereafter, the optical member 3 is attached to the device body 1 at the front side of the latter so as to cover the mounting substrates 21. Subsequently, the diffusing member 4 is attached to the device body 1 at the front side of the optical member 3, whereby the illumination device A is completely assembled (see FIGS. 3A and 3B).

Figure 4A:
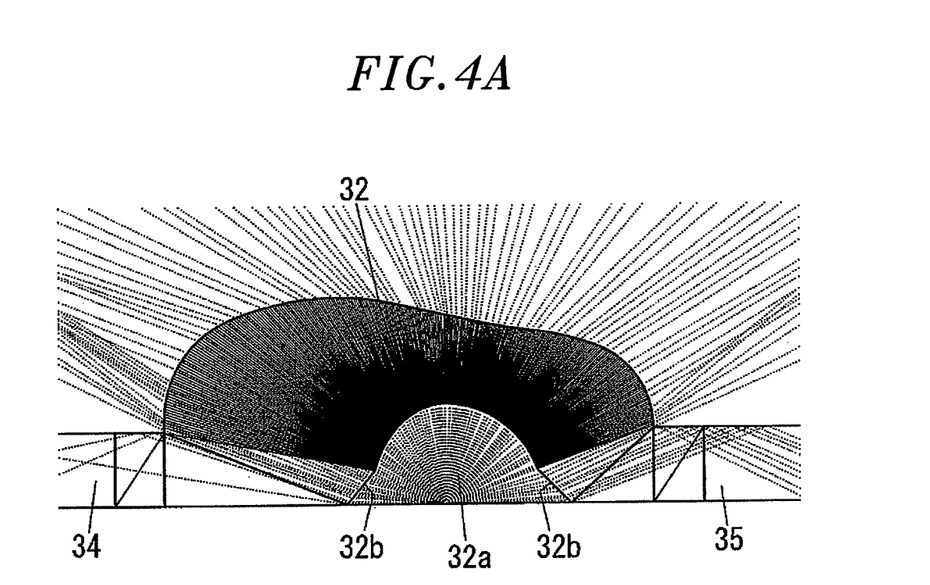
FIG. 4A is a light distribution characteristic diagram available when a light distribution control portion is provided in the optical member of the illumination device and FIG. 4B is a light distribution characteristic diagram available when a light distribution control portion is not provided in the optical member of the illumination device.
Figure 4B:
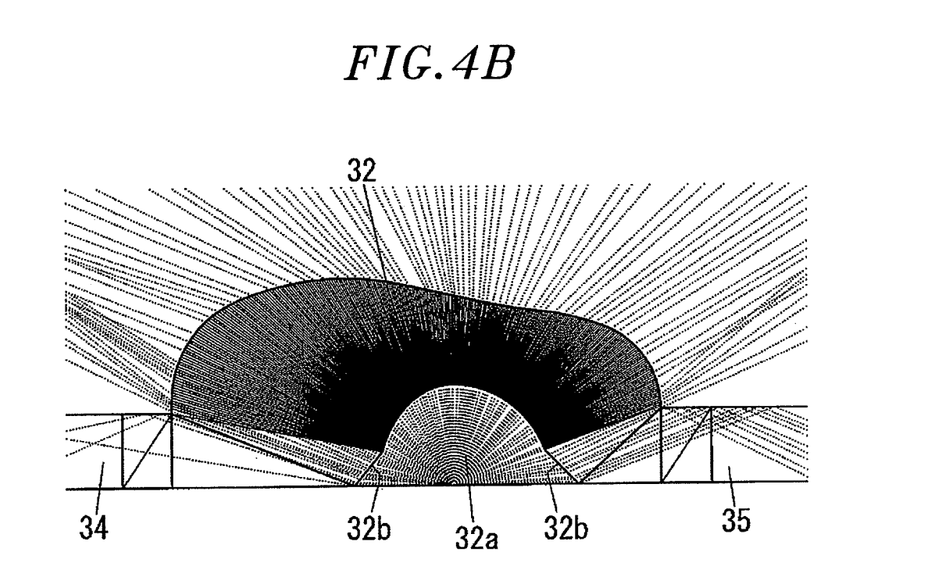

The hooking connector 6 (see FIG. 3B) one-piece formed on the rear surface of the power-feeding unit 5 is attached to the hooking hanger (not shown) arranged on the ceiling. Thus the illumination device A is installed in place. In this regard, FIG. 4A is a light distribution characteristic diagram available when the bevel portion 32b is formed at the opening edge of the storage recess portion 32a of the lens portion 32. FIG. 4B is a light distribution characteristic diagram available when the bevel portion 32b is not formed at the opening edge of the storage recess portion 32a of the lens portion 32. In case of the diagram shown in FIG. 4B, the light emitted from the LEDs 22 is incident on the lens portion 32 and on the rib 34 and the connecting portion 35. The light incident on the lens portion is projected in a radial pattern. The light incident on the rib 34 and the connecting portion 35 is totally reflected by the front surfaces (upper surfaces) of the rib 34 and the connecting portion 35 and is not projected to the outside. In other words, the light projection efficiency is reduced in proportion to the amount of the totally reflected light.

In case of the diagram shown in FIG. 4A, the light emitted from the LEDs 22 is incident on the lens portion 32. However, the light emitted toward the rib 34 and the connecting portion 35 is partially refracted by the bevel portion 32b and is distributed frontward. This makes it possible to increase the amount of the light projected frontward through the lens portion 32. This holds true in case of the lens portion 33. Therefore, no description will be made on the operation of the lens portion 33. In the present embodiment, the bevel portions 32b and 33b make up a light distribution control portion.

Figure 5:
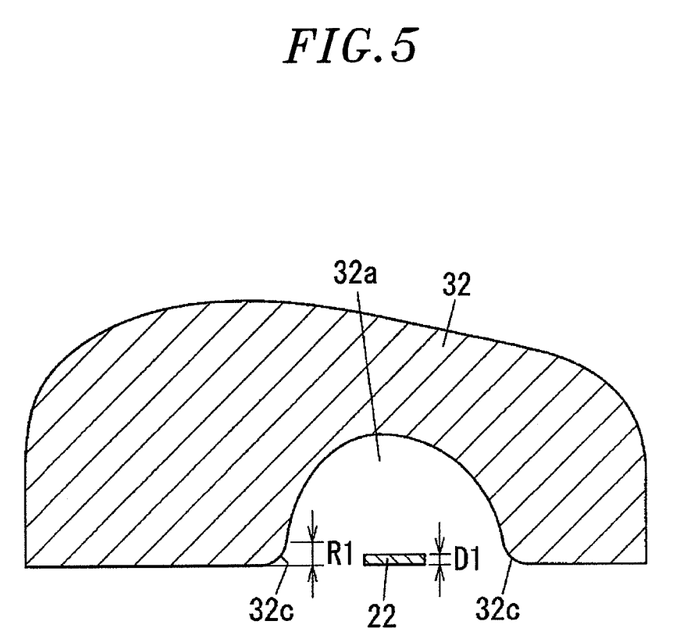
FIG. 5 is a section view schematically showing another example of the light distribution control portion provided in the optical member of the illumination device.

FIG. 5 is a section view schematically showing another example of the light distribution control portion. In the example shown in FIG. 1, the bevel portion 32b formed at the opening edge of the storage recess portion 32a makes up the light distribution control portion. In the example shown in FIG. 5, however, the light distribution control portion is made up of a convex portion (e.g., a rounded surface) 32c formed at the opening edge of the storage recess portion 32a. In this case, the light emitted from the LEDs 22 toward the rib 34 and the connecting portion 35 is refracted by the convex portion 32c and is distributed frontward. This makes it possible to increase the amount of the light projected frontward through the lens portion 32. It is preferred that the curvature radius R1 of the convex portion 32c be set larger than the thickness D1 of the LEDs 22. This holds true in case of the lens portion 33. Therefore, no description will be made on the operation of the lens portion 33.

With the present embodiment, the light emitted from the LEDs 22 toward the rib 34 and the connecting portion 35 can be distributed frontward through the use of the bevel portions 32b and 33b and the convex portions 32c and 33c. As a result, it is possible to provide an illumination device A capable of enjoying enhanced light projection efficiency. Unlike the prior art example, there is no need to increase the size of the lens portions 32 and 33. It is therefore possible to provide an illumination device A capable of enjoying reduced size. With the present embodiment, the light distribution control portion can be realized using a simplified configuration such as the bevel portions 32b and 33b or the convex portions 32c and 33c. If the LEDs 22 and the lens portions 32 and 33 are annularly arranged as in the present embodiment, the light emitted from the LEDs 22 can be substantially uniformly irradiated on a target irradiation surface (e.g., an indoor floor surface).

In the present embodiment, the light distribution control portion is made up of the bevel portions 32b and 33b or the convex portions 32c and 33c. However, the light distribution control portion is not limited to the one of the present embodiment but may have any shape as long as the light emitted from the LEDs 22 toward the rib 34 and the connecting portion 35 can be distributed frontward. Likewise, the light source is not limited to LEDs 22 but may be, e.g., an organic EL. In the present embodiment, description has been made on an example in which the LEDs 22 are arranged in two rows. Alternatively, the LEDs 22 may be arranged in a single row or in three or more rows. The arrangement of the LEDs 22 and the lens portions 32 and 33 is not limited to the annular arrangement but may be, e.g., a rectangular arrangement or a rectilinear arrangement.

Figure 6A:
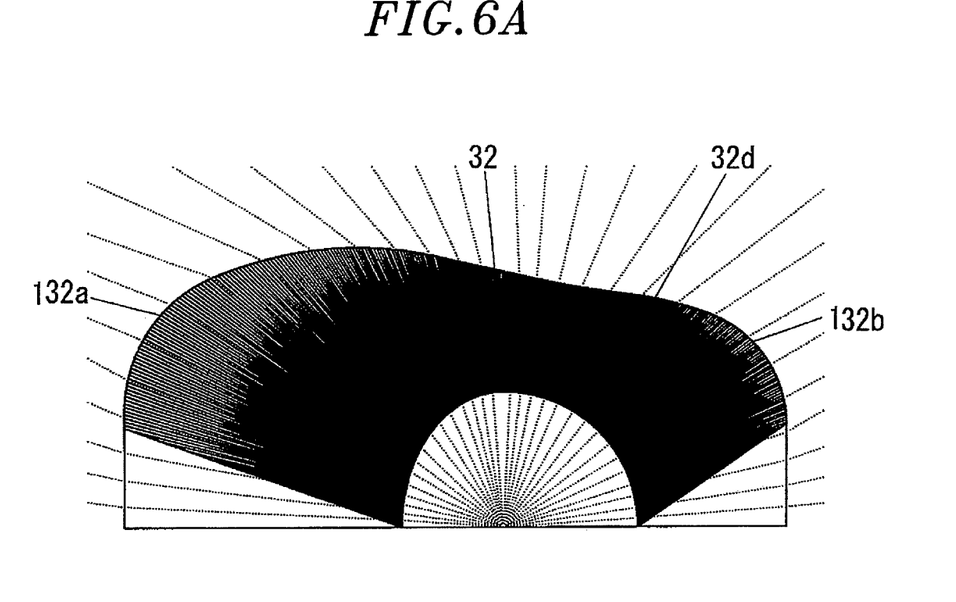
FIGS. 6A and 6B are light distribution characteristic diagrams of the optical member of the illumination device.
Figure 6B:
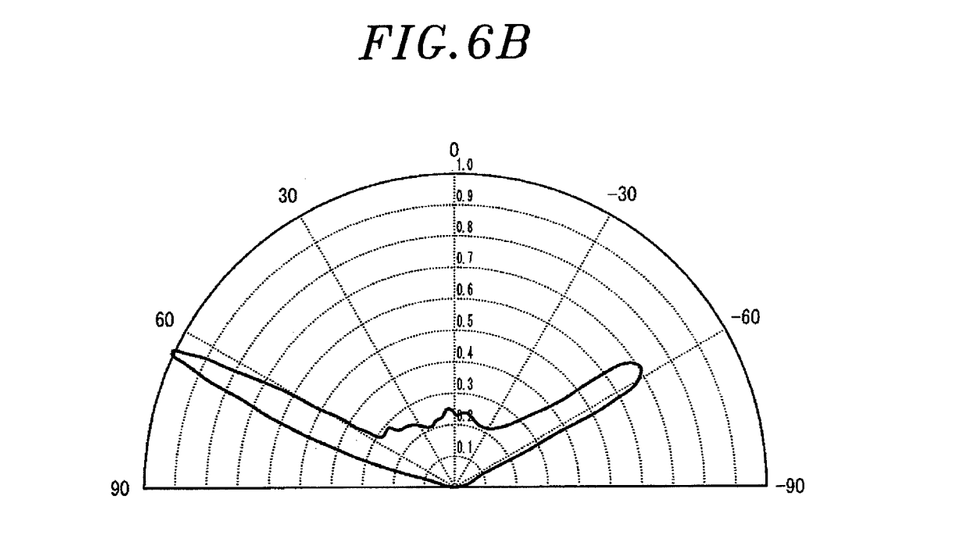

Next, description will be made on the light distribution characteristics of the lens portions 32 and 33 of the optical member 3. FIGS. 6A and 6B are light distribution characteristic diagrams of the lens portion 32. The light emitted from the LEDs 22 is radially projected from the projection surface 32d of the lens portion 32. In particular, the light emitted from the first convex portion 132a is distributed toward the left side in FIG. 6A, namely toward the central region of the diffusing member 4. The light emitted from the second convex portion 132b is distributed toward the right side in FIG. 6A, namely toward the outer edge region of the diffusing member 4.

Figure 7A:
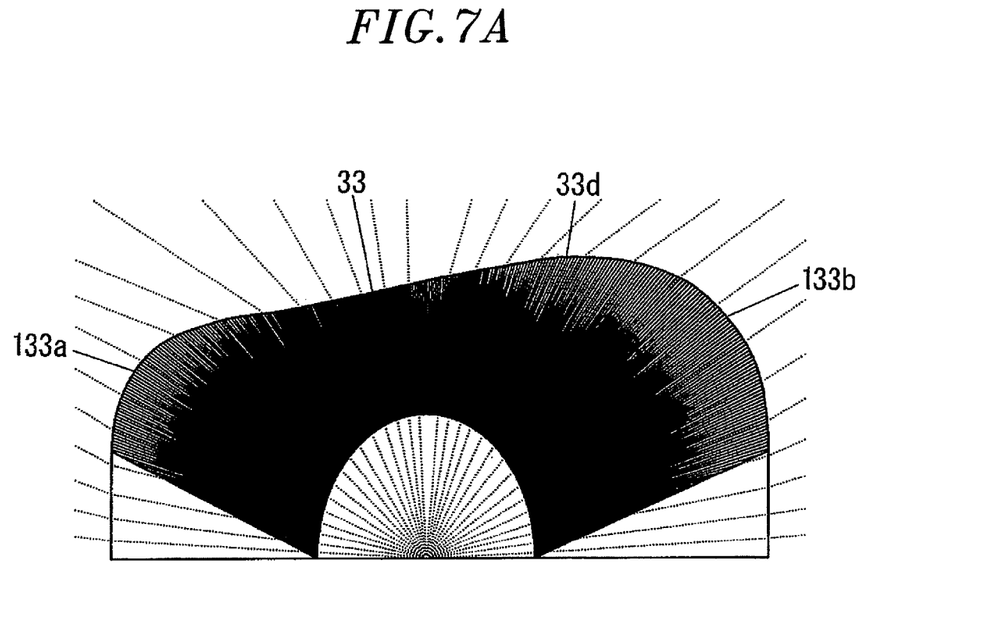
FIGS. 7A and 7B are another light distribution characteristic diagrams of the optical member of the illumination device.
Figure 7B:
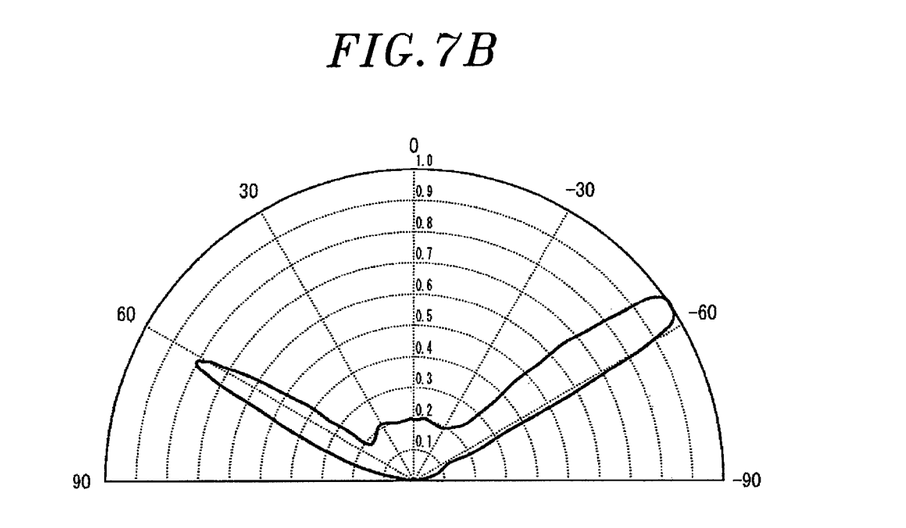

FIGS. 7A and 7B are light distribution characteristic diagrams of the lens portion 33. The light emitted from the LEDs 22 is radially projected from the projection surface 33d of the lens portion 33. In particular, the light emitted from the first convex portion 133a is distributed toward the left side in FIG. 7A, namely toward the central region of the diffusing member 4. The light emitted from the second convex portion 133b is distributed toward the right side in FIG. 7A, namely toward the outer edge region of the diffusing member 4.

Comparison of FIG. 6B and FIG. 7B reveals that the projection angle of the most-intensive major beam projected from the first convex portion 132a of the lens portion 32 with respect to the optical axes of the LEDs 22 (the vertical axes in FIGS. 6B and 7B) is larger than the projection angle of the most-intensive major beam projected from the first convex portion 133a of the lens portion 33. It can be seen that the major beam projected from the first convex portion 132a of the lens portion 32 is distributed nearer to the central area of the diffusing member 4 than the major beam projected from the first convex portion 133a of the lens portion 33. It can also be noted that the major beam projected from the first convex portion 132a of the lens portion 32 is more intensive than the major beam projected from the first convex portion 133a of the lens portion 33.

It can be further seen that the projection angle of the most-intensive major beam projected from the second convex portion 132b of the lens portion 32 with respect to the optical axes of the LEDs 22 is substantially equal to the projection angle of the most-intensive major beam projected from the second convex portion 133b of the lens portion 33. It can be noted that the major beam projected from the second convex portion 133b of the lens portion 33 is more intensive than the major beam projected from the second convex portion 132b of the lens portion 32. In the present embodiment, the major beam projected from the first convex portion 132a or 133a is a first major beam. The major beam projected from the second convex portion 132b or 133b is a second major beam.

With the present embodiment, the light emitted from the LEDs 22 can be distributed toward the central region of the diffusing member 4 through the use of the first convex portion 132a or 133a. Furthermore, the light emitted from the LEDs 22 can be distributed toward the outer edge region of the diffusing member 4 through the use of the second convex portion 132b or 133b. Since the light projected from the remaining portions of the lens portions 32 and 33 is distributed toward between the central region and the outer edge region of the diffusing member 4, it is possible to distribute the light emitted from the LEDs 22 over the whole surface of the diffusing member 4. As a consequence, it is possible to restrain the central region and the outer edge region of the diffusing member 4 from becoming dark and to provide an illumination device A having improved aesthetic appearance.

Figure 8A:
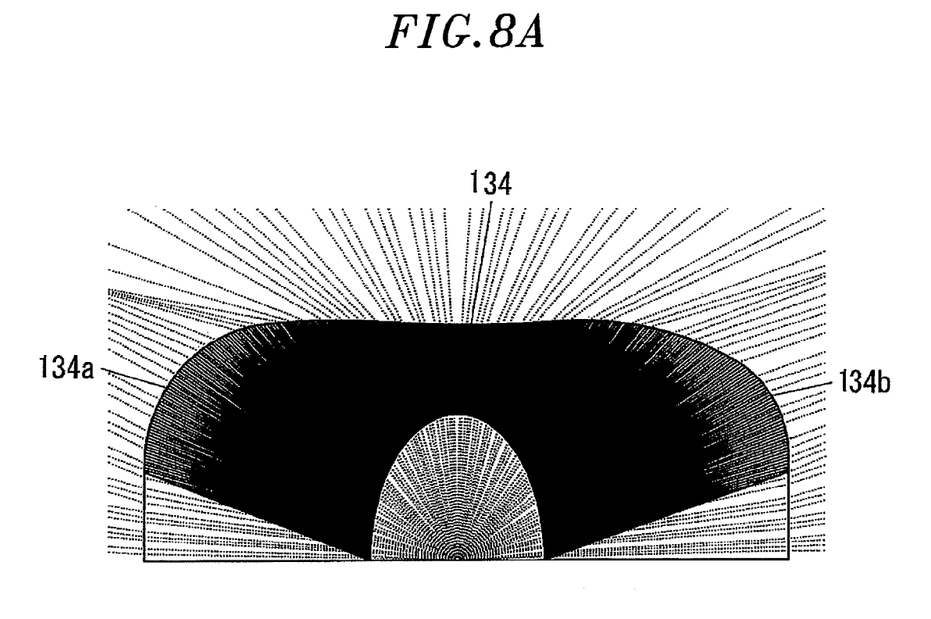
FIGS. 8A and 8B are further light distribution characteristic diagrams of the optical member of the illumination device.

In the embodiment described above, description has been made on an instance where the lens portions 32 and 33 are asymmetrical in the left-right direction and the lens portions 32 and 33 are different in shape from each other. For example, it may be possible to employ a lens portion 134 having a shape shown in FIG. 8A. In this case, all the first major beams projected from the first convex portion 134a of the lens portion 134 have the same projection angle. Likewise, all the second major beams projected from the second convex portion 134b have the same projection angle.

Figure 8B:
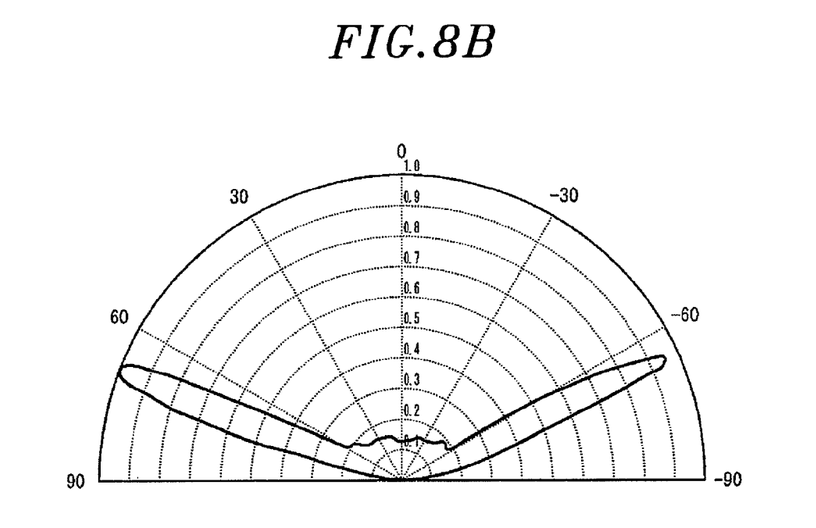

As a result, it is possible to reduce the brightness variation appearing in the diffusing member 4 and to provide an illumination device A capable of enjoying improved aesthetic appearance. The light distribution characteristics of the lens portion 134 are shown in FIG. 8B.

Figure 9A:
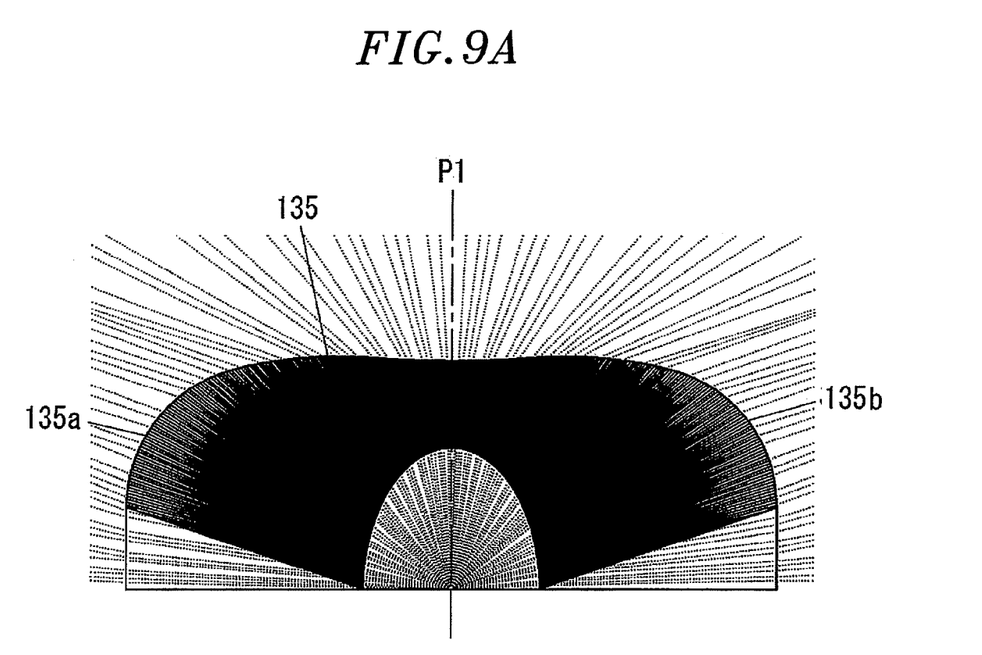
FIGS. 9A and 9B are still further light distribution characteristic diagrams of the optical member of the illumination device.
Figure 9B:
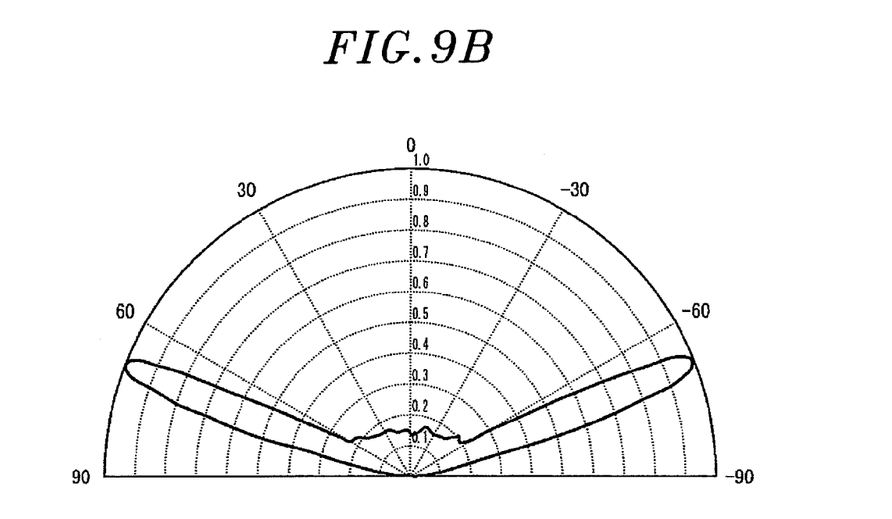

As shown in FIGS. 9A and 9B, it may be possible to employ a lens portion 135 having a symmetrical shape with respect to the optical axis P1 of each of the LEDs 22. In this case, the projection angle of the first major beam projected from the first convex portion 135a of the lens portion 135 with respect to the optical axis P1 is set equal to the projection angle of the second major beam projected from the second convex portion 135b. As a result, it is possible to easily perform light distribution design. The light projected from the central region of the lens portion 135 has the highest brightness. The brightness is monotonously decreased toward the opposite sides (namely, toward the first and second convex portions 135a and 135b). Thus the brightness distribution in the diffusing member 4 becomes smooth, which assists in improving the aesthetic appearance of the illumination device.

Figure 10A:
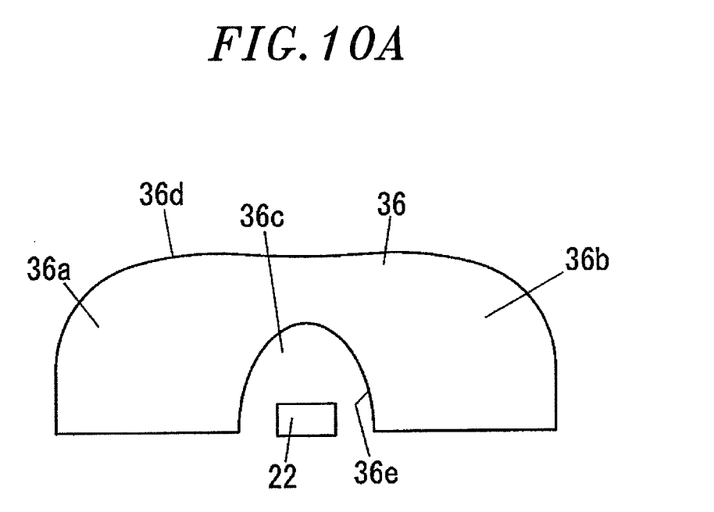
FIGS. 10A and 10B are partially enlarged views of the optical member of the illumination device.

As shown in FIG. 10A, the projection surface 36d and the incidence surface 36e of the lens portion 36 may be subjected to a diffusing treatment (e.g., painting, blasting or formation of irregularities). In this case, the brightness distribution in the diffusing member 4 is changed smoothly, which makes it possible to further improve the aesthetic appearance of the illumination device. The diffusing treatment may be performed with respect to both of the projection surface 36d and the incidence surface 36e as set forth above. Alternatively, only one of the projection surface 36d and the incidence surface 36e may be subjected to the diffusing treatment.

Figure 10B:
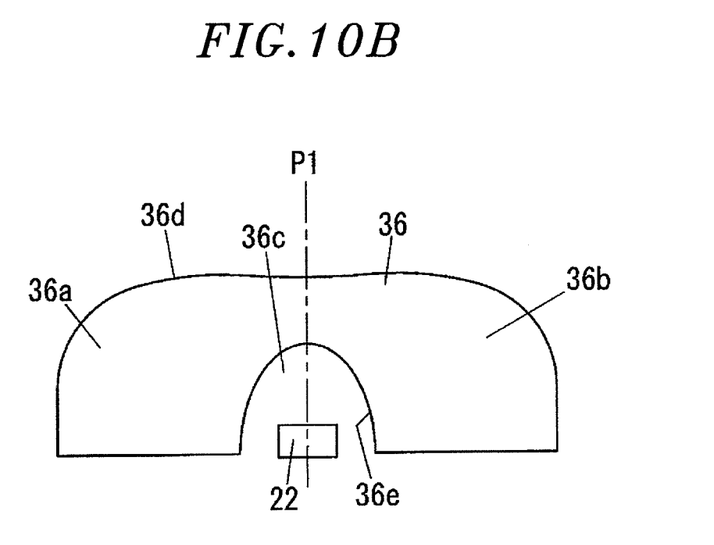

The brightness in the region near the optical axis P1 of each of the LEDs 22 is higher than the brightness in other regions. If the diffusivity in the regions of the projection surface 36d and the incidence surface 36e near the optical axis P1 is set higher than the diffusivity in other regions, it is possible to reduce the brightness in the region near the optical axis P1 (see FIG. 10B). In this case, the brightness distribution in the diffusing member 4 becomes smooth, which assists in further improving the aesthetic appearance of the illumination device.

In the present embodiment, the respective lens portions are formed into the same shape so that the projection angle of the first major beam projected from the first convex portion and the projection angle of the second major beam projected from the second convex portion can be equalized between the respective lens portions. However, the respective lens portions need not necessarily have the shape but may differ in shape from each other insofar as the projection angle of the first major beam and the projection angle of the second major beam can be equalized between the respective lens portions. In the present embodiment, each of the respective lens portions is symmetrically shaped with respect to the optical axis so that the projection angle of the first major beam projected from the first convex portion and the projection angle of the second major beam projected from the second convex portion can be equal to each other. However, each of the respective lens portions need not necessarily have the symmetrical shape but may have other shapes insofar as the projection angle of the first major beam and the projection angle of the second major beam can become equal to each other.

While the invention has been shown and described with respect to the embodiments, the present invention is not limited thereto. It will be understood by those skilled in the art that various changes and modifications may be made without departing from the scope of the invention as defined in the following claims.

What is claimed is:

1. An illumination device, comprising:
a plurality of light sources for emitting light; and
an optical member arranged in front of the light sources to control distribution of the light emitted from the light sources,
wherein the optical member includes a plurality of lens portions having storage recess portions formed in alignment with the light sources to accommodate the light sources and a plurality of ribs extending laterally from the lens portions to fix the lens portions to a substrate holding the light sources, each of the lens portions having a light distribution control portion formed in a rear opening edge of each of the storage recess portions to distribute frontward the light emitted from the light sources toward the ribs.

2. The device of claim 1, wherein the light sources are arranged in at least two rows with a specified gap left between the rows, the optical member including a connecting portion for interconnecting the lens portions provided in alignment with the light sources of the respective rows, the light distribution control portion being configured to distribute frontward the light emitted from the light sources toward the connecting portion.

3. The device of claim 1, wherein the light distribution control portion has a bevel portion formed in the rear opening edge of each of the storage recess portions by a chamfering work.

4. The device of claim 1, wherein the light distribution control portion has a convex portion formed in the rear opening edge of each of the storage recess portions.

5. The device of claim 1, wherein the light sources and the lens portions are arranged in an annular pattern.

6. An illumination device, comprising:
a device body;
a power-feeding unit arranged in a central region of the device body;
a plurality of LEDs annularly arranged around the power-feeding unit, the LEDs being turned on by electric power supplied from the power-feeding unit;
an optical member arranged in front of the LEDs to control distribution of the light emitted from the LEDs; and
a diffusing member arranged in front of the optical member to diffuse the light whose distribution is controlled by the optical member,
wherein the optical member includes forwardly-bulging lens portions provided in alignment with the LEDs, each of the lens portions having a first convex portion arranged in an end portion thereof near the power-feeding unit in a first direction interconnecting each of the lens portions and the power-feeding unit and configured to distribute the light emitted from the corresponding LEDs toward a central region of the diffusing member; and a second convex portion arranged in the opposite end portion from the power-feeding unit in the first direction and configured to distribute the light emitted from the corresponding LEDs toward an outer edge region of the diffusing member.

7. The device of claim 6, wherein a projection angle of a most-intensive first major beam projected from the first convex portion and a projection angle of a most-intensive second major beam projected from the second convex portion are set equal in the respective lens portions.

8. The device of claim 6, wherein a projection angle of a most-intensive first major beam projected from the first convex portion with respect to an optical axis of each of the LEDs and a projection angle of a most-intensive second major beam projected from the second convex portion with respect to the optical axis of each of the LEDs are set equal in the respective lens portions.

9. The device of claim 7, wherein the projection angle of the most-intensive first major beam projected from the first convex portion with respect to an optical axis of each of the LEDs and the projection angle of the most-intensive second major beam projected from the second convex portion with respect to the optical axis of each of the LEDs are set equal in the respective lens portions.

10. The device of claim 6, wherein each of the lens portions has an incidence surface and a projection surface, at least one of which is subjected to a diffusing treatment.

11. The device of claim 6, wherein each of the lens portions is configured such that the diffusivity in a region near an optical axis of the corresponding LED becomes higher than the diffusivity in other regions.

* * * * *